Patented Mar. 10, 1931

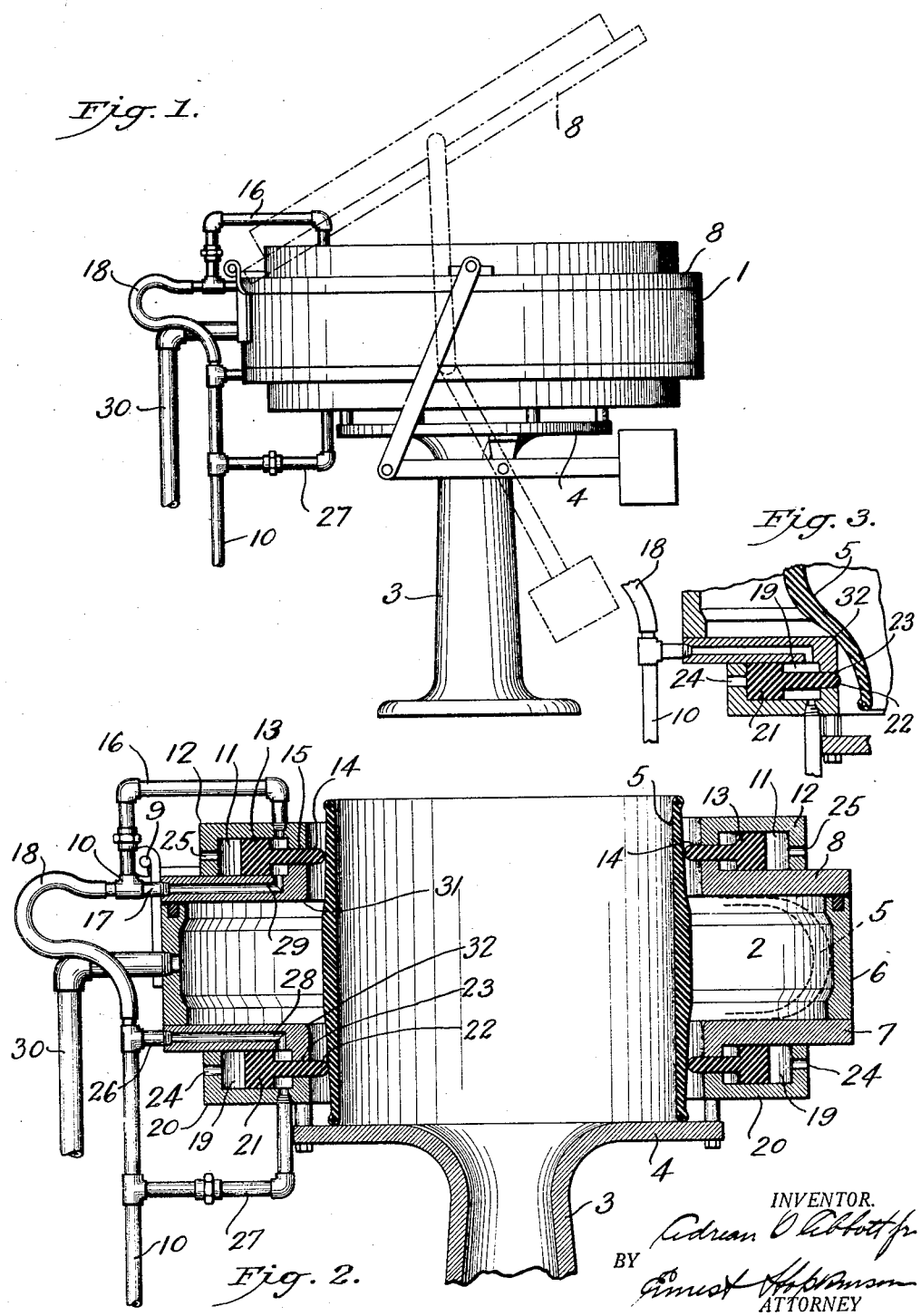

1,796,177

UNITED STATES PATENT OFFICE

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN

APPARATUS FOR MANUFACTURING TIRE CASINGS

Application filed September 24, 1928. Serial No. 308,089.

This invention relates to apparatus for manufacturing tire casings by the vacuous method, in which unshaped tire casings or so-called "pulley bands" are brought to tire shape in a vacuum chamber and has for its primary object to provide an improved apparatus of this character which may be easily and rapidly operated.

Further objects are to provide an improved initial or temporary sealing device, to provide an improved method of controlling this device, and to permit the use of harder and tougher sealing rings.

This apparatus is an improvement upon prior patent to Abbott, No. 1,507,563 granted September 9, 1924, and reference may be made to such patent for a more complete understanding of the general construction and of the specific use for which the invention is intended.

The many other objects and advantages of the invention will be better understood by reference to the following specification when considered in connection with the accompanying drawing, in which:

Fig. 1 is a side elevation of one embodiment of the invention;

Fig. 2 is a central vertical section of the apparatus shown in Fig. 1, the parts being in position to start the shaping operation; and Fig. 3 is a detailed sectional view showing the relative position of the parts when the shaping operation has been partially performed.

Referring to the drawings, the device comprises primarily a box or casing 1 forming a hollow annular chamber 2 substantially U-shaped in cross section and open on its inner periphery. This chamber is supported on a suitable base or frame as 3 provided with a support 4 to center the unshaped tire casing or pulley band 5 in the proper vertical position opposite the open face of the vacuum chamber.

In the present embodiment, the casing or box forming the chamber 2 comprises an outer wall 6, a bottom wall 7, and a top wall 8. The top wall 8 forms the cover of the apparatus and is hingedly mounted upon the outer wall 6 as at 9 to permit the shaped tire casing to be removed from the apparatus. This hinge connection may be located at any convenient place, but preferably near the pneumatic tube connection 10, for reasons which will be presently explained.

On the top plate or cover 8 is provided a hollow annular chamber 11 preferably substantially rectangular in cross section and formed in part by the wall 8 and the substantially U-shaped ring 12. An expansible sealing ring 13 substantially fits between the side walls of this chamber and is slidable therein substantially radially of the chamber 2.

The ring 13 is preferably formed of elastic material, such as rubber composition, and has on its inner face an annular strip or rib 14 of less thickness than the body of the ring. This rib extends through an opening 15 in the inner wall of the chamber 11 and preferably forms a closure for such opening.

The normal position of the ring 13 is such that, due to its elasticity it presses firmly around the pulley band 5, thereby sealing the shaping chamber 2 from the atmosphere, so that when vacuum is applied to this chamber, the normal air pressure acting on the inner face of the band or casing results in forcing this band to the position indicated in dotted lines in Fig. 2. Fluid under pressure is admitted to the chamber 11 in front of the ring 13 and on opposite sides of the rib 14 by branch pipes 16 and 17 which communicate with the main fluid pressure pipe 10 connected to a source of pressure (not shown). A flexible section or hose 18 is preferably provided in this pipe to enable the hinged cover 8 to be elevated.

A chamber 19, corresponding to the chamber 11, is provided on the bottom plate 7 and the casing 20 of this chamber is similar to the casing 12. In this chamber 19 is a ring 21 corresponding to the ring 13 and likewise having a rib as 22 on its inner face projecting through an opening 23 in the front wall of the casing. One or more apertures 24 are provided in the outer wall of the casing 20 to prevent back pressure or vacuum from interfering with the operation of the ring 21.

Similar apertures 25 are provided in the casing 12 for the same purpose. Branch pipes 26 and 27 communicate with the chamber 19 in front of the ring 21 and on opposite sides of the rib 22 and these are connected to the main pressure pipe 10, as in the case of the pipes 16 and 17 which communicate with the chamber 11. Passages 28 and 29 in the walls 7 and 8 respectively, form extensions of the corresponding pipes 26 and 17.

A vacuum pipe 30 communicates with the main shaping chamber 2. This pipe is connected to a suitable source of vacuum supply (not shown). The air pressure in the main pipe 10 is controlled by valve mechanism (not shown) of the conventional type, such as the "Ross" valve which when turned off allows the air within the chambers 11 and 19 to be released to the atmosphere.

In the operation of the apparatus, the rings 13 and 21 are first expanded to substantially the position shown in Fig. 3 to facilitate the insertion of the pulley band 5. This is accomplished by admitting fluid under pressure into the chambers 11 and 19 in front of the rings 13 and 21. This pressure, acting between the front faces of the rings and the corresponding inner walls of their respective chambers, causes the rings to increase in girth and to accordingly slide outwardly or rearwardly in their chambers. The air in these chambers is forced outwardly during this movement through the vents 24 and 25. The pulley band is now inserted in the apparatus in the position indicated in solid lines in Fig. 2 and then the air pressure is released in the pipe 10 in the manner described and the rings 13 and 14, due to their natural elasticity, contract in diameter and force the inner peripheries of the ribs 14 and 22 against the pulley band in the manner indicated. This provides an initial seal for the chamber 2. The vacuum is now applied to the chamber 2 through the pipe 30, causing the pulley band to be drawn therein in the customary method. Simultaneously with the initial portion of the pulley band expanding operation, the sealing rings may be expanded in the manner described so that the ribs 14 and 22 move outwardly with the pulley band but maintaining the seal until the band comes into contact with the inner corners 31 and 32 of the vacuum chamber, as illustrated in Fig. 3, forming the final seal. This method of gradually withdrawing the rings is advantageous as is reduces the friction, but the expansion of these rings by fluid pressure at this time may be dispensed with and the rings expanded by the rearward and outward movement of the pulley band.

From the foregoing description it will be evident that the elastic sealing rings are quickly and easily expanded by fluid pressure to facilitate the insertion of the pulley band or casing to be formed, and when released, form an effective initial or temporary seal for the vacuum chamber. The expansion of the rings by means of fluid pressure in the manner described permits the use of harder and tougher sealing rings than can be used where the expansion is produced by vacuum, because the pressure is not restricted to that of the atmosphere, which is the limit provided when a vacuum is used. In accordance with the present invention, any desired pressure may be provided to overcome the elasticity of the sealing rings.

I am aware that the form and arrangement of parts may be varied without departing from the spirit of my invention and contemplate all changes therewithin as fall within the scope of the following claims, as well as all uses in the manufacture of rubber articles to which the apparatus may be put.

Having thus described my invention what I claim and desire to protect by Letters Patent is:

1. An apparatus for manufacturing tire casings by the vacuous method, comprising a main annular chamber open on its inner periphery and having top and bottom walls and an auxiliary annular chamber adjacent the inner margin of one of the side walls and having an opening in its inner wall, an expansible sealing ring fitted between the side walls of said auxiliary chamber and having an annular rib on its inner periphery normally projecting through said opening, and means for admitting fluid under pressure to said auxiliary chamber to increase the girth of said ring and draw said rib therein.

2. In apparatus for manufacturing tire casings by the vacuous method, a main hollow chamber open on its inner annular periphery and having top and bottom walls, the edges of which are of a diameter greater than the casing being manufactured, an auxiliary hollow chamber mounted on the outer face of each of said walls and having an opening in the inner periphery thereof, a sealing member fitting within each of said auxiliary chambers and normally having its inner marginal portion projecting through the opening in the inner wall thereof to form an extension of the corresponding wall of the main chamber, the inner diameter of said sealing member being normally not greater than the outer diameter of the opposing portion of said casing, and means for admitting fluid under pressure to said auxiliary chambers to draw said sealing members into their respective chambers and increase the girth thereof.

3. In apparatus for manufacturing tire casings, sealing mechanism comprising a hollow annular chamber having an opening in the inner periphery wall of less width than the chamber, an expansible ring in said chamber provided with an annular rib on its inner periphery normally projecting through said opening, and means for admitting fluid under pressure to said chamber to increase the girth of said ring and draw said rib into said chamber.

4. In apparatus for manufacturing tire casings, sealing mechanism comprising a hollow annular chamber having an opening in the inner peripheral wall of less width than the chamber, an expansible ring fitting between the side walls of the chamber, an annular rib on the inner periphery of said ring normally projecting through said opening and forming a closure therefor, and means for admitting fluid under pressure to said chamber to increase the girth of said ring and said rib.

5. In apparatus for manufacturing tire casings, sealing means comprising a hollow annular chamber having an opening in the inner peripheral wall of less width than the chamber, an expansible ring in said chamber provided with an annular rib on its inner periphery normally projecting through said opening, and means for admitting fluid under pressure to said chamber between the inner face of said ring and the opposing wall of the chamber to act against said face to increase the girth of said ring.

6. In apparatus for manufacturing tire casings, sealing mechanism comprising a hollow annular chamber having an opening in the inner peripheral wall of less width than the chamber, an expansible ring in said chamber provided with an annular rib of less thickness than the body of the ring projecting through said opening and forming a closure therefor, and means for admitting fluid under pressure to said chamber between the inner wall thereof and the inner periphery of the body of the ring and on opposite sides of said rib to increase the girth of said ring.

7. In apparatus for manufacturing tire casings by the vacuous method, a hollow annular chamber open on its inner periphery, means for exhausting air therefrom in combination with rings of extensible composition projecting beyond the inner periphery of said chamber, and means for subjecting said rings to greater than atmospheric pressure to vary the girth thereof.

8. In apparatus for manufacturing tire casings, sealing means comprising a hollow annular chamber, an expansible ring in said chamber, means for admitting fluid to said chamber between the inner wall thereof and said ring to expand said ring and one or more vent openings in said chamber in rear of said ring.

Signed at Detroit, county of Wayne, State of Michigan, this 18th day of September, 1928.

ADRIAN O. ABBOTT, Jr.